Oct. 10, 1944.   L. E. ENDSLEY   2,359,900
METHOD OF MAKING CAR SPRINGS
Filed Aug. 21, 1941   2 Sheets-Sheet 2
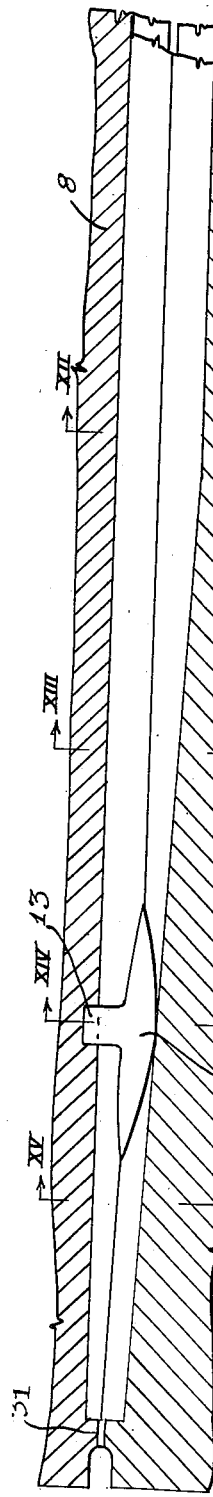
Fig.11.
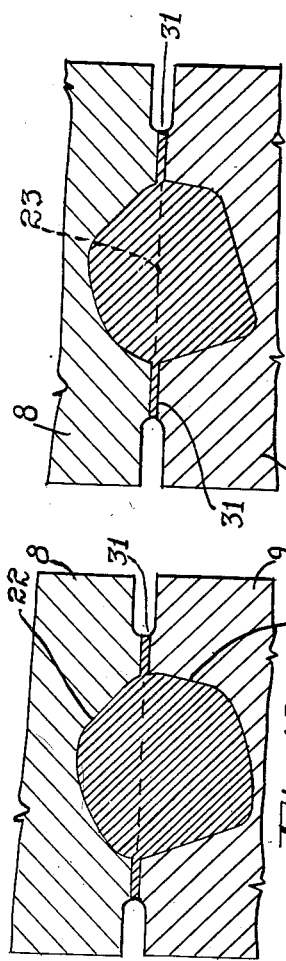
Fig.12.
Fig.13.
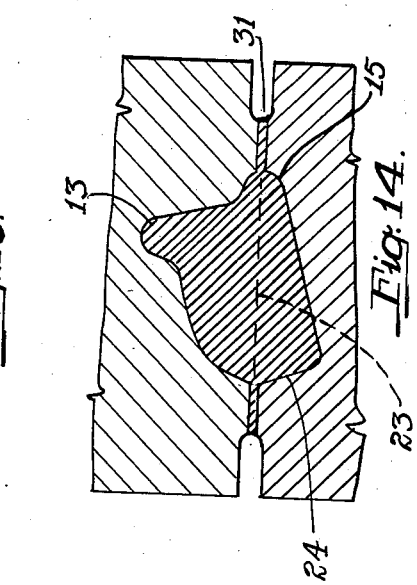
Fig.14.
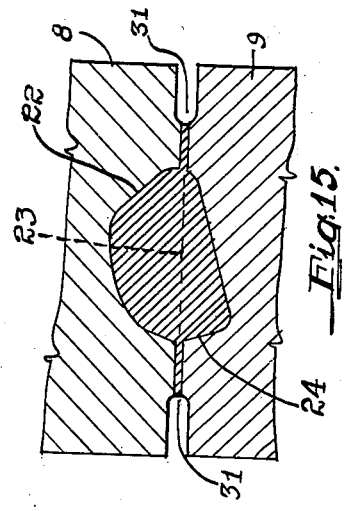
Fig.15.
INVENTOR
Louis E. Endsley
By Archworth Martin
His Attorney Patented Oct. 10, 1944

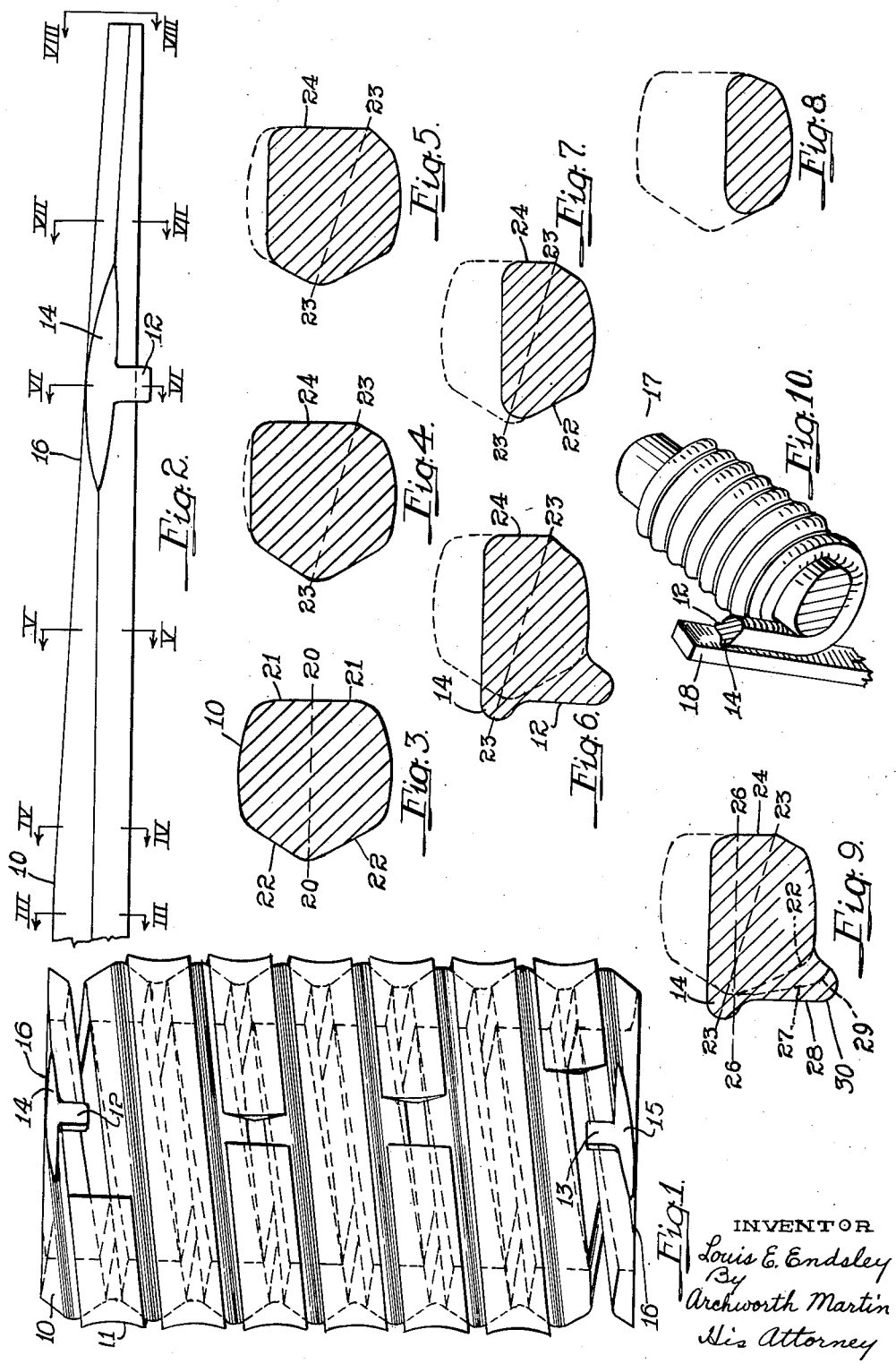

2,359,900

UNITED STATES PATENT OFFICE 2,359,900

METHOD OF MAKING CAR SPRINGS

Louis E. Endsley, Pittsburgh, Pa., assignor to The Frost Railway Supply Co., Detroit, Mich., a corporation of Michigan Application August 21, 1941, Serial No. 407,768

4 Claims. (Cl. 29—173)

My invention relates to friction springs of the type wherein inner and outer helically-coiled springs are arranged in coaxial relation, and with the turns of one coil lying partially between turns of the other coil, so that the springs not only serve as cushioning elements because of their inherent resiliency but also have frictional engagement with one another, to produce a snubbing effect, as explained for example in my Patent 2,095,545, issued Oct. 12, 1937. The invention is particularly useful in springs which are interposed between bolsters and truck frames of railway cars, but it will be understood that it may have other uses also.

One object of my invention is to provide a method of making friction coil springs that are of improved form, particularly with respect to the stop shoulders that are formed on one coil in position to prevent creeping of the other coil.

Another object of my invention is to provide a method of making the main coil of a friction spring, and patricularly the flattened or tapered extremities thereof, in such manner that larger stop shoulders for holding the other coil can be formed thereon in the flattening dies than is possible by the methods heretofore employed, and a method wherein that side of the main coil which is opposite to its friction surfaces can be made flat during the forging process, and thus maintained in a plane perpendicular to the plare which bisects the angle of the two friction surfaces.

A further object of my invention is to provide a method of making a spring structure wherein a main coil, that has its end turns beveled or flattened for effective engagement with their seats, may have the stop shoulders of adequate strength formed nearer to the extremities of the coil, for engagement by the extremities of the other or outer coil.

Still another object of the invention is to provide on the main coil bosses or noses of such form and arrangement that they will not only facilitate the operation of bending the main coil to shape, but will reinforce the stop shoulders against thrusts imposed by the extremities of the outer coil, in service, thereby permitting the placing of the stop shoulders nearer to the extremities of the main coil and permitting of increased effective frictional area between the inner and outer coils.

It will be understood that my invention is applicable to other forms of frictional coil springs than that shown in my said patent, including the use of a friction coil made in one piece instead of in three sections as shown in my said patent.

In the accompanying drawings, Figure 1 is an elevational view of a spring embodying my invention; Fig. 2 is a side view on an enlarged scale of a portion of a bar from which the main coil of the spring in Fig. 1 is formed; Figs. 3, 4, 5, 6 and 7 are sectional views taken on the lines III—III, IV—IV, V—V, VI—VI and VII—VII respectively of Fig. 2, on a still further enlarged scale; Fig. 8 is an end view of the bar of Fig. 2 at the line VIII—VIII; Fig. 9 is a diagrammatic view indicating the manner in which the main spring is forged at its tapered ends, to provide for increased height of the stop shoulders; Fig. 10 is a schematic view showing the manner in which a bar with its ends shaped as in Fig. 2 is bent around a mandrel to form the main coil, Fig. 11 is a longitudinal sectional view through a portion of two dies, showing the manner in which a spring bar is forged, and Figs. 12, 13, 14, and 15 are cross-sectional views on an enlarged scale, of the dies, taken at the lines XII—XII, XIII—XIII, XIV—XIV and XV—XV, respectively.

As shown in Fig. 1, the spring comprises an inner main coil 10 and an outer friction coil 11, the outer coil being divided into three sections— each of approximately two turns or convolutions. The coils can be assembled and will function after the manner explained in detail in my said patent. It will be understood, however, that the outer coil can be formed of a single bar of material.

The principal features of distinction between the present invention and various prior patents resides in the provision of stop shoulders 12 and 13 and bosses 14 and 15 near the extremities of the main coil.

In the manufacture of the main coil 10 of the spring, a steel bar is first shaped to approximately the form shown in cross se tion in Fig. 3, throughout its length. Thereupon the bar is heated to forging temperature and the end portions thereof placed between dies 8 and 9 as shown in Figs. 11 to 15, to reduce such end portions to a flattened tapered shape as indicated at 16, so that the end turns of the main coil will have better seating engagement with spring plates, bolsters etc. The flattening to tapered shape is a procedure common in the art. However, during the step of forging the ends of the springs to flattened shape, I utilize a part of the displaced metal to form the stop shoulders 12 and 13 and the bosses 14 and 15. By utilizing displaced metal to form these shoulders and bosses, I am enabled to form the stop shoulders 12 and 13 for limiting the movements of the coil 11, at points further toward the extremities of the main spring 10, without weakening the main coil. This arrangement therefore permits of longer areas of frictional contact between the main coil and the friction coil 11. The base portions of the stop shoulder 12 and the boss 14 merge, so that the boss 14 serves to reinforce or strengthen the bar at the stop shoulder, for this reason also permitting the placing of the stop shoulders nearer to the extremities of the main coil, without weakening the tapered portions of the coil. This is true also with respect to the shoulder 13 and boss 15.

In the forging of friction springs to form the flattened tapered ends and the stop shoulders, it has been common practice to part the forging dies on a line that bisects the friction angles and the base, as indicated by the line 20—20 in Fig. 3. The use of this parting line necessitates a 3° or 4° angle at 21 on that side of the bar stock which engages the mandrel when coiling, there being a relief or slope from the median line to the edges, to provide clearance for removal of the dies from the bar. Thus the mandrel-engaging side 21—21 of the bar is of slightly convex form, so that there will be tendency for it to tilt in one or the other direction when being coiled. This tilting of the bar causes the frictional surfaces 22 to be tilted out of true alignment for engagement with the frictional surfaces of the outer coil, so that there cannot be proper frictional engagement between the two coils. By my method I so arrange the dies that the parting line will be at an angle approximating that indicated by the line 23—23. I am therefore enabled to maintain that portion of the bar stock which comes in contact with the mandrel, on a straight line as indicated at 24. This straight line, of course, shortens some toward the extremity of the coil, but it always has an advantage in that there is no tendency for tilting the bar and thus the friction surfaces on the other side of the bar stay in true alignment, it being true, of course, that the straight area 24 will be of decreased width toward the end of the bar.

Another advantage of parting my die blocks on this line 23—23 is that a higher stop (which extends a greater distance from the friction surfaces) can be formed, for holding the outer coils from creeping. In explanation of this, reference is made to Fig. 9. If the dies are parted along the line 26—26, the stop shoulder can be formed only to the line 27, since a clearance of 3° or 4° has to be provided for in the dies to permit removal thereof. By making the parting line on the line 23—23, I am able to make the line 28 of the die about 10° higher (farther from the friction surface 22) than the line 27.

The furthest point 30 from the friction surface 22 of the bar at the stop is much greater than the furthest point 29 is from the friction surface 22. Thus I am enabled to make a stop that is much higher from the friction surfaces and thereby reduce danger of the outer coil jumping over or crowding past the stop.

It will be understood that the die cavities for both ends of the bar stock will be of the form shown in Fig. 12, with their cavities of reduced depth toward the extremities of the bar stock, and they have recesses to form the stop shoulders 12 and 13 and the bosses 14 and 15. The die blocks 8 and 9 will be mounted in and operated by suitable presses. The flash or fins at the spaces 31 between the dies will be trimmed away upon removal of the bar from the dies.

The provision of the boss 14 results in still another advantage, in that it facilitates the bending of the steel bar to coil form without damage to the stop shoulder 12. After the steel bar or rod has been forged to provide the stop shoulders, bosses and the tapered ends as above indicated, it is heated and then wrapped around a mandrel 17, somewhat after the manner shown in Fig. 10, and in accordance with well-known practice in the spring art. A wiper bar 18, also well-known in the art, is employed as a guide to cause the spring bar to be bent about the mandrel, during rotation of the mandrel. When the bar has been nearly completely wrapped to coil form, the wiper bar 18 will be engaged by the boss 14, thus preventing the bar 18 from coming into engagement with the stop shoulder 12 and thereby avoiding injury to the stop shoulder or lowering of its height.

I claim as my invention:

1. In the art of making friction coil springs, the steps which comprise forming bar stock for one of the coils, with a flat surface on one side thereof throughout substantially its entire length and with relatively angular friction surfaces on its opposite side that are arranged in convex relation throughout the major portion of the bar length, for frictional engagement with another coil, then forging end portions of the bar stock between recessed dies whose parting line is in a plane that extends from one longitudinal edge of the flattened surface to the line of juncture between the said friction surfaces, one of the die cavities tapering to a reduced depth adjacent to its extremity at an end of the bar stock, and bending the bar stock to helical form upon a mandrel which is engaged by said flat surface.

2. In the art of making friction coil springs, the steps which comprise forming bar stock for one of the coils, with a flat surface on one side thereof throughout substantially its entire length and with relatively angular friction surfaces on its opposite side that are arranged in convex relation throughout the major portion of the bar length, for frictional engagement with another coil, then forging end portions of the bar stock between recessed dies whose parting line is in a plane that extends from one longitudinal edge of the said flat surface to the line of juncture between the said friction surfaces, one of the die cavities tapering to a reduced depth adjacent to its extremity at an end of the bar stock, and one of the dies having at one of said friction surfaces and adjacent to said extremity a recess into which metal is displaced to form a stop shoulder for the end of a cooperating friction coil that is assembled with the bar stock member when it has been wound to coil form, and bending the bar to helical form upon a mandrel which is engaged by said flat surface.

3. In the art of making friction coil springs, the steps which comprise forming bar stock for one of the coils, with a flat surface on one side thereof throughout substantially its entire length and with relatively angular friction surfaces on its opposite side that are arranged in convex relation throughout the major portion of the bar length, for frictional engagement with another coil, then forging end portions of the bar stock between recessed dies whose parting line is in a plane that extends from one longitudinal edge of the said flat surface to the line of juncture between the said friction surfaces, one of the die cavities tapering to a reduced depth adjacent to its extremity at an end of the bar stock, and one of the dies having at one of said friction surfaces and adjacent to said extremity a recess into which metal is displaced to form a stop shoulder for the end of a cooperating friction coil that is assembled with the bar stock member when it has been wound to coil form, the dies having a recess for receiving displaced metal, so positioned as to produce a reinforcing boss that merges with the stop shoulder, and bending the bar to helical form upon a mandrel which is engaged by said flat surface.

4. In the art of making friction coil springs, the steps which comprise forming bar stock for one of the coils, with a flat surface on one side thereof throughout substantially its entire length and with relatively angular friction surfaces on its opposite side that are arranged in convex relation throughout the major portion of the bar length, for frictional engagement with another coil, then forging end portions of the bar stock between recessed dies whose parting line is in a plane that extends from one longitudinal edge of the said flat surface to the line of juncture between the said friction surfaces, one of the die cavities tapering to a reduced depth adjacent to its extremity at an end of the bar stock, and one of the dies having at one of said friction surfaces and adjacent to said extremity a recess into which metal is displaced to form a stop shoulder for the end of a cooperating friction coil that is assembled with the bar stock member when it has been wound to coil form, the dies having a recess for receiving displaced metal, so positioned as to produce a boss at the vicinity of the stop shoulder, and so located that in coiling the bar on a mandrel a wiping member for bending the bar is guided by the boss from engagement with the stop shoulder, and bending the bar to helical form upon a mandrel which is engaged by said flat surface, by holding the wiping member against the said convex side of the bar and imparting relative rolling movement to the bar and the mandrel.

LOUIS E. ENDSLEY.